(12) United States Patent
Fox

(10) Patent No.: US 6,847,070 B2
(45) Date of Patent: Jan. 25, 2005

(54) FIVE TRANSISTOR CMOS PIXEL

(75) Inventor: Eric Charles Fox, Waterloo (CA)

(73) Assignee: DALSA, Inc., Waterloo (CA)

( * ) Notice: Subject to any disclaimer, the term of this patent is extended or adjusted under 35 U.S.C. 154(b) by 76 days.

(21) Appl. No.: 10/338,738

(22) Filed: Jan. 9, 2003

(65) Prior Publication Data

US 2003/0227018 A1 Dec. 11, 2003

Related U.S. Application Data

(62) Division of application No. 09/722,609, filed on Nov. 28, 2000, now abandoned.
(60) Provisional application No. 60/223,966, filed on Aug. 9, 2000.

(51) Int. Cl.$^7$ .............................................. H01L 31/062
(52) U.S. Cl. .................... 257/291; 257/292; 250/208.1; 348/294; 348/308
(58) Field of Search ........................................ 257/291

(56) References Cited

U.S. PATENT DOCUMENTS

| | | |
|---|---|---|
| 5,146,480 A | 9/1992 | Sankaranarayanan et al. |
| 5,760,723 A | 6/1998 | McGrath et al. |
| 5,867,215 A | 2/1999 | Kaplan |
| 5,881,184 A | 3/1999 | Guidash |
| 5,900,623 A * | 5/1999 | Tsang et al. ............. 250/208.1 |
| 6,002,123 A | 12/1999 | Suzuki |
| 6,115,065 A | 9/2000 | Yadid-Pecht et al. |
| 6,133,563 A | 10/2000 | Clark et al. |
| 6,215,113 B1 | 4/2001 | Chen et al. |
| 6,326,230 B1 | 12/2001 | Pain et al. |
| 6,437,379 B2 | 8/2002 | Kopley et al. |
| 6,445,022 B1 | 9/2002 | Barna et al. |

FOREIGN PATENT DOCUMENTS

EP           1152472 A2     4/2001

* cited by examiner

Primary Examiner—Douglas Wille
(74) Attorney, Agent, or Firm—Millen, White, Zelano & Branigan, P.C.

(57) ABSTRACT

A method of sensing radiation in a pixel includes applying a transfer clock signal, applying a pixel reset clock signal, and applying a pixel reset voltage. The applying a transfer clock signal applies the transfer clock signal to a gate electrode of a transfer gate transistor. The applying a pixel reset clock signal applies the pixel reset clock signal to a gate electrode of the pixel reset transistor. The applying a pixel reset voltage applies the pixel reset voltage to a drain of the pixel reset transistor. The method further includes switching the transfer clock signal to a high state, switching the pixel reset clock signal to a high state, switching the pixel reset voltage to a low state, switching the pixel reset voltage to a high state, and switching the pixel reset clock signal to a low state at a beginning of an integration cycle.

18 Claims, 8 Drawing Sheets

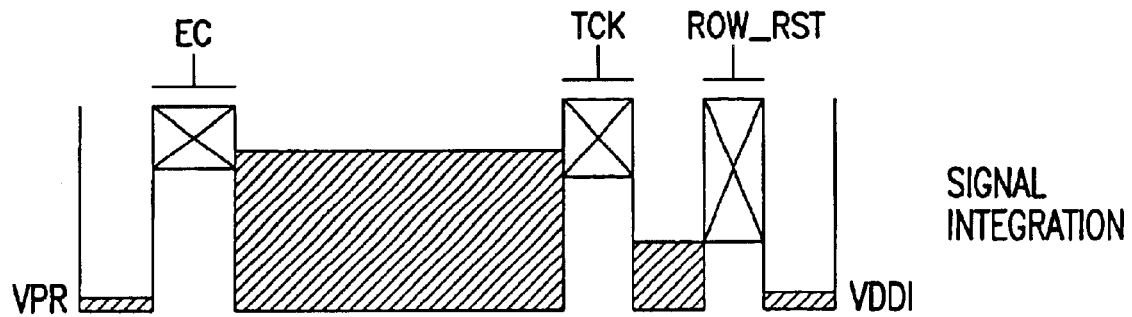
FIG.3A — SIGNAL INTEGRATION
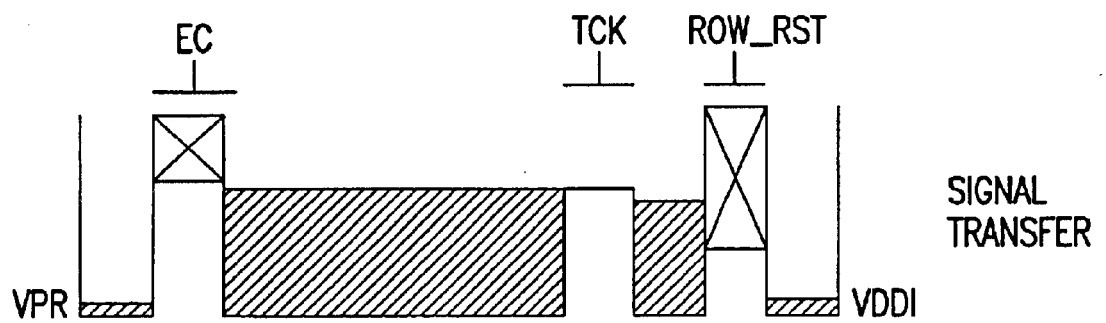
FIG.3B — SIGNAL TRANSFER
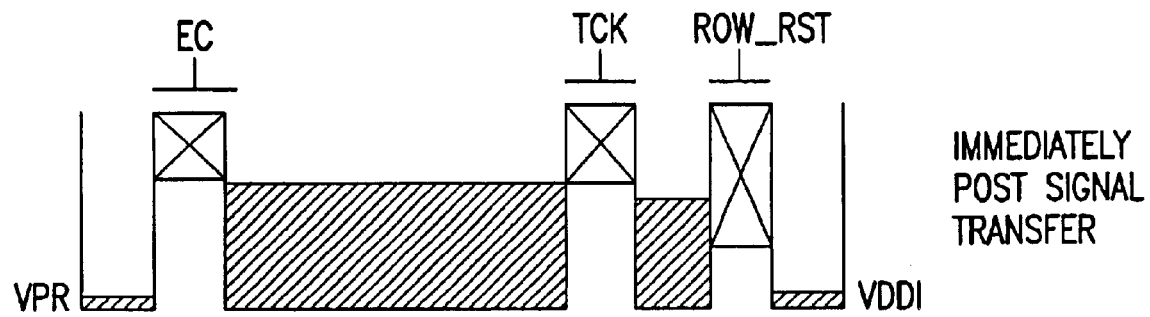
FIG.3C — IMMEDIATELY POST SIGNAL TRANSFER

IMMEDIATELY AFTER SIGNAL TRANSFER

EXPOSURE CONTROL ENABLED

PHOTOSITE HARD RESET

PHOTOSITE SOFT RESET

SIGNAL INTEGRATION

US 6,847,070 B2

FIVE TRANSISTOR CMOS PIXEL

CROSS REFERENCE TO RELATED APPLICATIONS

This patent application is a Divisional application of U.S. patent application Ser. No. 09/722,609, filed Nov. 28, 2000 now abandoned which claims benefit of the Aug. 9, 2000 filing date of U.S. Provisional Application No. 60/223,966, all the subject matters of which are herein incorporated by reference.

BACKGROUND OF THE INVENTION

1. Field of the Invention

The present invention relates to a novel pixel architecture for high speed motion capture CMOS image sensors.

2. Description of Related Art

FIGS. 2A and 2B are circuit schematics of conventional CMOS pixels known as a 3T pixel (for three transistor pixel) and a 4T pixel (for four transistor pixel). The 3T pixel has a reverse biased photodiode coupled between substrate voltage VSUB and the reset gate transistor. When operated, an RST signal applied to the electrode of the reset gate transistor causes a reverse bias to be set on the photodiode equal to output drain voltage VOD less VSUB. Between drain supply VDD and output signal terminal OUT is coupled two series transistors. The drain of a first transistor is coupled directly to VOD, and a gate of the first transistor is coupled to the cathode of the photodiode so that the first transistor operates as a source follower. The source of the source follower transistor is coupled through a row transistor to output terminal OUT. In applications, plural such 3T pixels are coupled to the same output terminal OUT. By selectively applying row address signal ROW to the gate of the selected row transistor, different pixels can be coupled to output terminal OUT. The 4T pixel (FIG. 2B) is like the 3T pixel (FIG. 2A) except that the 4T transistor has a transfer gate transistor coupled between the reset transistor and the photodiode so that a sense node may be created between the transfer transistor and the reset transistor and the sense node may be isolated from the photosite.

There is a need to capture fast changing scenes without the intrusion of a "rolling shutter" artifact while at the same time allowing for antiblooming and/or exposure control functionality. Further, there is a need to operate the pixel without image lag and with minimal fixed pattern noise due to variations in the fat zero signal. Know cameras use external shutters, mechanical or otherwise, to eliminated the rolling shutter artifacts.

U.S. Pat. No. 5,900,623 to Tsang, et al. describes a five transistor pixel with two transistors arranged as a differential pair. However, operation of the Tsang, et al. pixel requires that complementary signals be applied to FETS in a differential configuration, and that photocharge be accumulated on capacitor MCAP at a drain of one of the differentially configured FETS. The Tsang, et al. pixel does not allow for electronically "shuttered" image acquisition.

U.S. Pat. No. 6,115,065 to Yadid-Pecht and Fossum describes a pixel with four transistors and a photogate in a configuration of a 4T pixel. This pixel does not provide protection against a rolling shutter artifact (as described herein) at the same time as antiblooming and exposure control.

U.S. Pat. No. 5,881,184 to Guidash describes a pixel with a transistor to allow resetting of a sense/storage node on a pixel by pixel basis. However, the pixel does not provided antiblooming functionality at the same time as it provides protection against the rolling shutter artifact.

U.S. Pat. No. 6,002,123 to Suzuki describes a 4T pixel. However, the pixel does not provided antiblooming functionality at the same time as it provides protection against the rolling shutter artifact. Further, Suzuki does not describe the hard/soft reset sequences describe in the present patent.

U.S. Pat. No. 5,867,215 to Kaplan describes a CCD spill architecture that allows for enhanced dynamic range. However, the pixel does not provided antiblooming functionality and does not describe the hard/soft reset sequences describe in the present patent.

U.S. Pat. No. 5,760,723 to McGrath et al. describes a CCD spill well architecture that makes use of a fill and spill methodology. However, McGrath et al. do not describe a hard/soft reset methodology that removes image lag by the hard reset and minimizes noise with the soft reset.

SUMMARY OF THE INVENTION

It is an object to the present invention to achieve a fully integrated (no external shutter) and electronically adjustable sensor. This is achieved by adding one transistor to a known 4T pixel and controlling the clocking voltages as described herein. It is a further object of the present invention to eliminate the rolling shutter artifacts while providing antiblooming and exposure control functionality. It is yet another object of the present invention to eliminate image lag while reducing fixed pattern noise.

These and other objects are achieved in a pixel that includes five transistors, a photodetector and a storage node. A first transistor is coupled between the photodetector and the storage node. A second transistor is coupled between the storage node and an output drain voltage. A third transistor is coupled between the photodetector and a pixel reset voltage, wherein the pixel reset voltage is different than the output drain voltage.

Alternatively, these and other objectives are achieved in a sensor that includes a pixel that, in turn, includes five transistors, a photodetector and a storage node. A first transistor is coupled between the photodetector and the storage node. A second transistor is coupled between the photodetector and a pixel reset voltage. A gate electrode of the first transistor is coupled to a transfer clock signal that has a low state and a high state. A gate electrode of the second transistor is coupled to a pixel reset clock signal that has a low state and a high state. The transfer clock signal and the pixel reset clock signal are both at a low state during a charge integration interval.

These and other objectives are achieved in an alternative embodiment in which a pixel includes five transistors, a photodetector and a storage node. A first transistor is coupled between the photodetector and the storage node. A second transistor is coupled between the storage node and an output drain voltage. A third transistor is coupled to the photodetector in a configuration that affects an exposure control and antiblooming function in the pixel.

These and other objectives are achieved in another alternative embodiment in which a pixel includes five transistors, a photodetector and a storage node. A first transistor is coupled between the photodetector and the storage node in a configuration that eliminates a rolling shutter artifact. A second transistor is coupled between the storage node and an output drain voltage. A third transistor is coupled between the photodetector and a preset voltage in a configuration that affects an exposure control and antiblooming function in the pixel wherein the preset voltage is different than an output drain voltage.

These and other objectives are achieved with a method of sensing radiation in a pixel that includes steps of applying a transfer clock signal to a gate electrode of a transfer gate transistor, applying a pixel reset clock signal to a gate electrode of the pixel reset transistor, and applying a pixel reset voltage to a drain of the pixel reset transistor. The method further includes steps of switching the transfer clock signal to a low state, switching the pixel reset clock signal to a high state, switching the pixel reset voltage to a low state, switching the pixel reset voltage to a high state, and switching the pixel reset clock signal to a low state at a beginning of an integration cycle.

BRIEF DESCRIPTION OF DRAWINGS

The invention will be described in detail in the following description of preferred embodiments with reference to the following figures wherein:

FIGS. 3A through 3C are potential diagrams illustrating collected charge transfer from the photosite to the sense node according to the invention;

The potentials depicted in FIGS. 3A through 3H and 7A through 7H use conventional n-channel potential diagrams. In these diagrams, more positive potentials are depicted toward the bottom of the figure, and less positive potentials are depicted toward the top of the figure. For example, a zero voltage reference may be depicted at the top of the potential diagram, and a +3 volt signal would be a step down toward the bottom of the figure with respect to the zero volt reference. A +5 volt signal would be a further step down toward the bottom of the figure with respect to both the +3 volt signal and the zero volt reference.

DETAILED DESCRIPTION OF PREFERRED EMBODIMENTS

Figure 1:
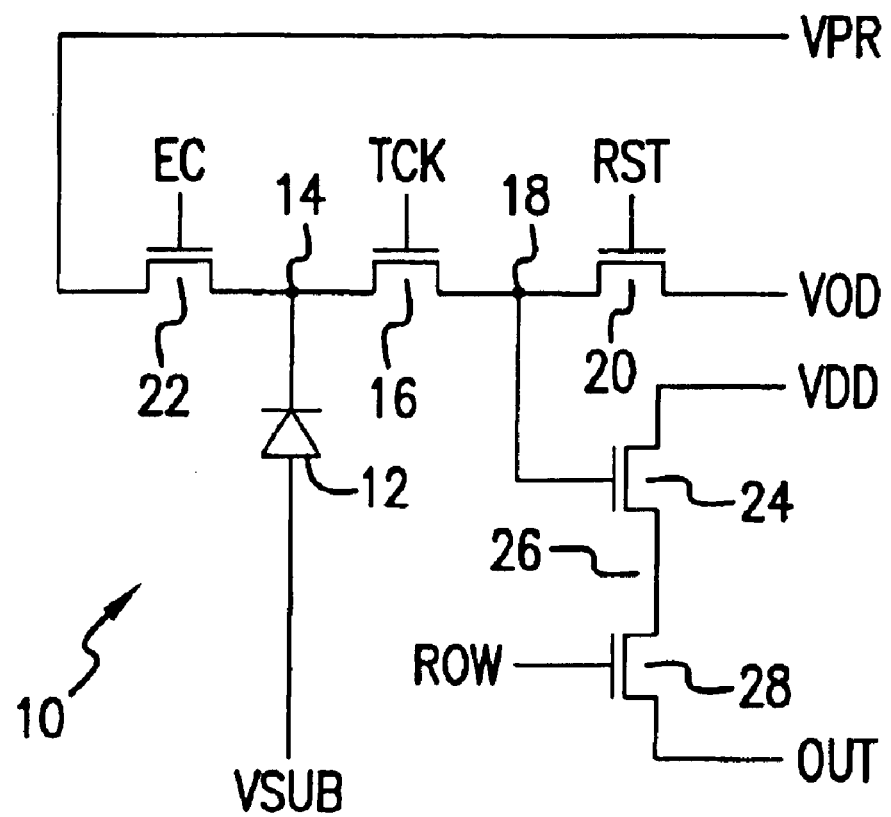
FIG. 1 is a circuit schematic of a five transistor pixel according to the present invention.

In FIG. 1, a new pixel includes a light shield (not shown in FIG. 1 for clarity) overtop of a sense node (i.e., junction 18) and exposure control gate transistor 22 off of the photosite. The sense node (junction 18) includes the diode region between reset gate transistor 20 and transfer gate transistor 16. However, the light shield (not shown in the circuit schematic for clarity) prevents generation of photo charge in the sense node. Advantages of this pixel are that the pixel can be implemented in such a way that the "rolling shutter" problem associated with conventional CMOS image sensors can be eliminated while at the same time allowing for antiblooming (AB) operation and electrode exposure control (EC) operation. The new pixel is a 5-transistor architecture ("5T"). In contrast, a "4T" pixel can be operated to either eliminate rolling shutter problem or allow for AB/EC functionality, but not both at the same time.

Another feature of the 5T pixel is the specific timing and biasing sequence used such that this pixel can be operated with both low lag and low fixed pattern noise.

In FIG. 1, improved 5T pixel 10 includes a photodetector, in this example, a reverse biased photodiode 12 coupled between substrate voltage VSUB and junction 14. Transfer gate transistor 16 is coupled between junctions 14 and 18 and has a gate electrode controlled by transfer clock TCK. Reset gate transistor 20 is coupled between junction 18 and drain voltage VOD and has a gate electrode controlled by reset clock RST. Exposure control transistor 22 is coupled between junction 14 and preset voltage VPR and has a gate electrode controlled by exposure control voltage EC. Source follower transistor is coupled between drain voltage VDD and junction 26 and has a gate electrode coupled to junction 18. Row address transistor 28 is coupled between junction 26 and pixel output terminal OUT and has a gate electrode coupled to row addressing voltage ROW. Plural such pixels 10 are connected to output terminal OUT; however, the row addressing voltage ROW from only one pixel at a time is permitted to couple a signal from junction 26 to output OUT.

In general operation, exposure control transistor 22 sets voltage VPR on junction 14 while either the transfer gate transistor, the reset gate transistor, or both are turned off. Then photocharge is integrated on junction 14 and subsequently transferred to the gate electrode of source follower 24. The detailed method of operation is referred to as a hard/soft reset. The photosite is first "hard" reset with a dc bias (e.g., voltage VPR), and is then "soft" reset by spilling excess charge over the reset gate. CCD image sensors, in contrast to CMOS sensors, use a related technique referred to as "fill and spill".

The operation of the new pixel is illustrated in FIGS. 3A through 3C. The integration and transfer operation is illustrated in FIG. 3A. This is what eliminates rolling shutter operation.

In FIG. 3A, the photosite (e.g., the well between the preset gate transistor and the transfer gate transistor) has been integrating photocharge for a period of time. In FIG. 3B, TCK is clocked high to causes the photocharge to be transferred to the sense node (e.g., junction 18 or the well between the transfer gate transistor and the reset gate transistor) which is also a part of pixel 10. In FIG. 3C, TCK is clocked back to low. The photocharge is now stored on the sense node for readout. The sense node is covered with a light shield (not shown for clarity) and hence the photosite (junction 14) can immediately begin to accumulate photocharge from the next exposure period without altering the charge stored on the sense node. In practice the photosite to sense node operation will take place for all pixels in the frame at the same time. After the transfer operation, the individual sense nodes can be read out in sequence.

Figure 2A:
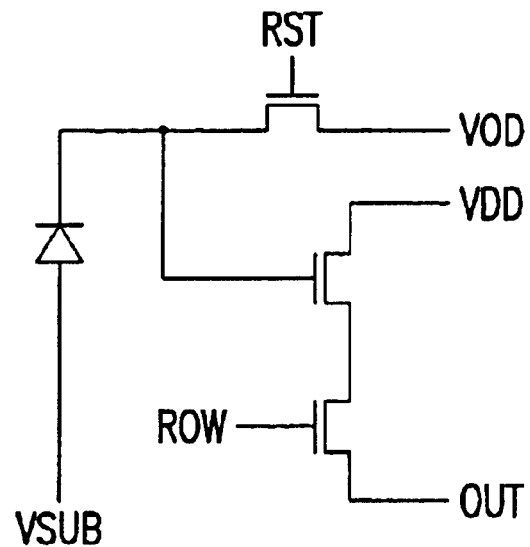
FIGS. 2A and B are circuit schematics of known three and four transistor pixels, respectively.

This architecture eliminates the "rolling shutter" phenomenon associated with conventional CMOS pixels (the "3T" pixel illustrated in FIG. 2A). The rolling shutter issue can be described with the aid of FIGS. 4A, 4B, 5A, 5B, 6A and 6B. These figures illustrate the sequence of row readouts and the associated integration times sensed by each row in the array.

Figure 6A:
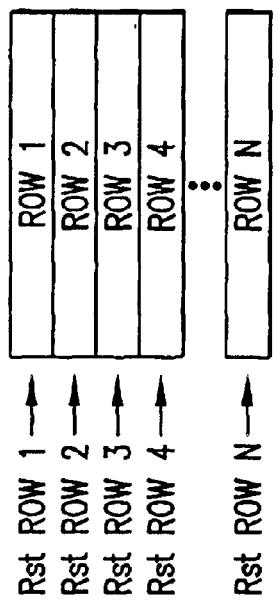
FIGS. 6A and 6B are timing diagrams showing the timing sequence for an array of N rows configured with a known 3T pixel.
Figure 6B:
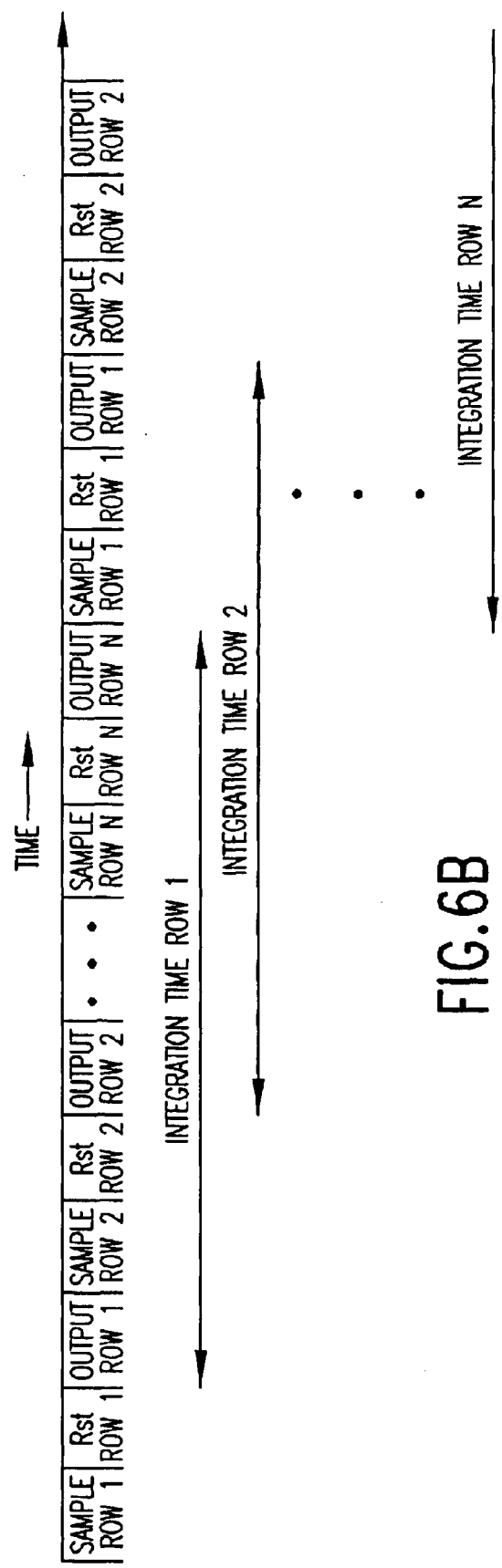

In a conventional CMOS "3T" pixel, the photosite is both the charge collection site and the sense node. Consequently, when operating at the maximum readout speed, the integration time is the time interval between successive reads of the same row as depicted in FIGS. 6A and 6B. The integration time period for each row begins and ends at a different time so that a "rolling shutter" is created. Note the staggered integration times depicted in FIG. 6B. If a single exposure were collected of a fast moving scene (e.g. a pencil being waved back and forth rapidly in front of the camera), the stored image would not display a straight pencil, but rather a curvy pencil since different rows were exposed while the pencil was in different locations. It follows that an external shutter must be used with a conventional CMOS image to capture fast changing scenes.

The "5T" pixel eliminates this issue by constructing each pixel to have a separate well for integration of photocharge (i.e., junction 14) and for the storage of the charge collected during a frame (i.e., junction 18). The storage node is light shielded and hence the amount of charge stored on the storage/sense node is unaffected by the image light which falls on the sensor.

Figure 2B:
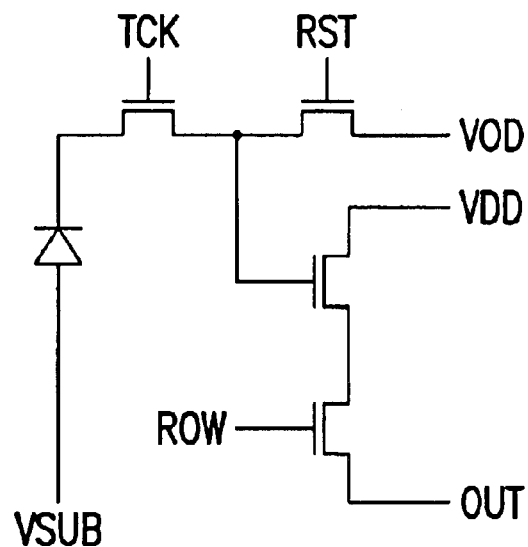
Figure 5A:
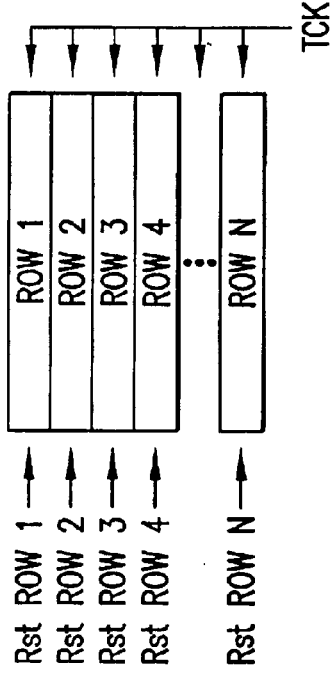
FIGS. 5A and 5B are timing diagrams showing the timing sequence for an array of N rows configured with a known 4T pixel.
Figure 5B:
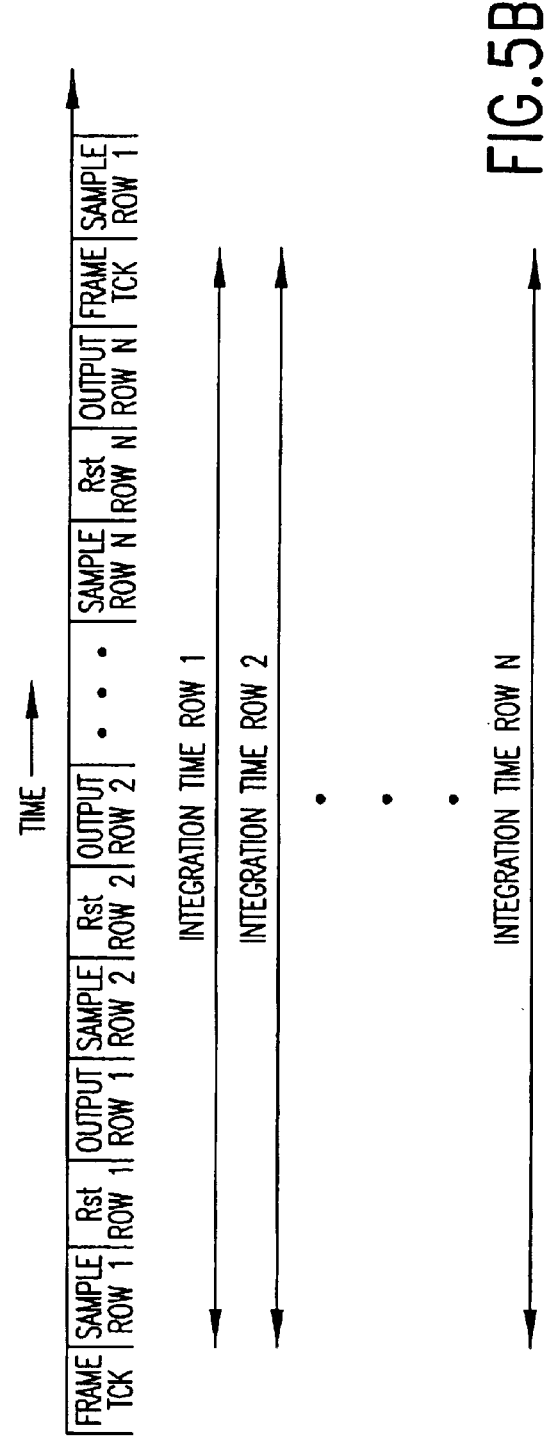

The rolling shutter issue can also be eliminated with a "4T" pixel array (FIG. 2B) as illustrated in FIGS. 5A and 5B; however, antiblooming functionality may not be achieved at the same time. Here the transfer gate transistors are all clocked at the same time and the charge in the photosites is transferred within each pixel to a respective pixel sense node. If the sense node is light shielded, the charge on the sense nodes can be read out at any time during the time interval when the next frame image is being integrated. The first issue with this arrangement is that the minimum duration of the charge collection time (integration time) in the photosite is fixed to, and defined by, the readout time for the array. This may be too long of an exposure time for fast moving scenes. However, this problem can be worked around to some degree. After the array is read out, the transfer gate electrodes and reset gate electrodes can all be activated then turned off to preset the photodiode potential. The photosites can then collect charge for an arbitrarily short period before doing the frame transfer operation, after which, the photocharge can be subsequent readout. The limitation with this approach is that the maximum effective frame rate is necessarily reduced. Another issue with using a known "4T" pixel in this manner is that for high scene illumination (which is usually the case when imaging fast moving scenes) any particular photosite may fill to the top during the frame readout operation. The charge will then spill out of the photosites (i.e., a blooming effect) and contaminate the signal still to be read out on the sense node. The 4T pixel can be clocked to allow for antiblooming and exposure control functionality, but not without contaminating the charge stored on the storage/sense node.

In contrast, the "5T" pixel adds a dedicated exposure control gate transistor 22, and therefore, allows for non-rolling shutter operation and for antiblooming and exposure control functionality at the same time. Note that a "5T" pixel can be made to behave like a "4T" pixel by holding the exposure control gate transistor inactive, and can be made to behave as a "3T" pixel by holding the exposure control gate transistor inactive and the transfer gate transistor always active.

An additional feature of the present invention is the manner in which the photosite is reset. The most straight-forward approach would be to hold VPR high and to then clock the voltage EC to a high level and then back to a low level. When voltage EC is high, charge in the photosite would spill to the VPR drain until the voltage on the photosite is equal to the high voltage of voltage EC minus the threshold voltage of the exposure control transistor. By arranging the high level EC on the gate electrode of the exposure control transistor so that it is slightly smaller than the high level on clock voltage TCK, the pixel clocking processes will always transfer some charge to the storage node when clock voltage TCK is clocked high. This "extra" charge is referred to as "fat zero" charge.

The photosite operation as described above is referred to as a "soft" reset. The "soft" reset is defined to be when the level to which the photosite falls during reset is governed by subthreshold current flow across the preset transistor (exposure control transistor 22 in FIG. 1 in the present invention). Hence the final voltage on the photosite is a function of the duration of the voltage EC high pulse and of the voltage level on the photosite just prior to clocking the voltage EC high. This results in an undesired phenomenon known as image lag.

An alternative way, and a preferred way, to reset the photosite is to clock the voltage EC high and then low while voltage VPR is maintained at a sufficiently low voltage that the potential beneath the preset gate electrode becomes larger than voltage VPR during the reset operation (i.e., current freely flows between drain VPR and the photosite and is not limited by a subthreshold voltage of a transistor. This ensures that the voltage on the photosite becomes exactly voltage VPR, and this is referred to as a "hard" reset.

However, the transfer across transfer gate transistor 16 (FIG. 1) is still "soft" in nature (i.e., after a transfer, the photosite voltage will move to a voltage equal to the high TCK voltage minus the threshold voltage of the transfer gate transistor). Therefore, the collected charge transferred to junction 18 (sense node or storage site) is still "soft". Since the threshold voltages of transistors vary across the chip, the magnitude of the fat zero signal will vary across the chip. This phenomenon is known as a fixed pattern noise (FPN). The present invention takes advantage of the fact that spatial variations in the threshold voltage of transistors will be smaller as between transistors within small area of the same pixel than will be the variations in the threshold voltage of transistors across the whole circuit array.

Figure 3D:
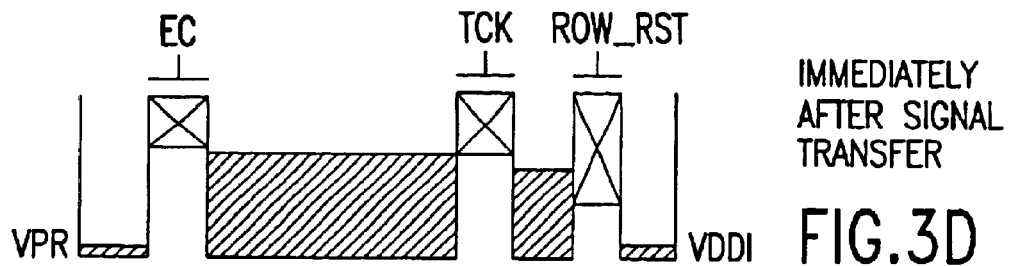
FIGS. 3D through 3H are potential diagrams illustrating the hard and soft reset sequence of the pixel according to the invention.
Figure 3E:
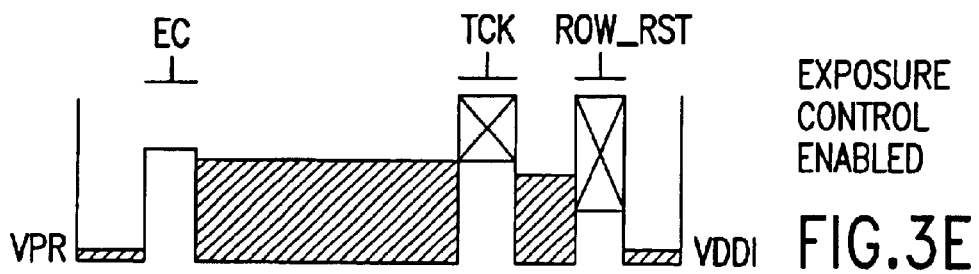
Figure 3F:
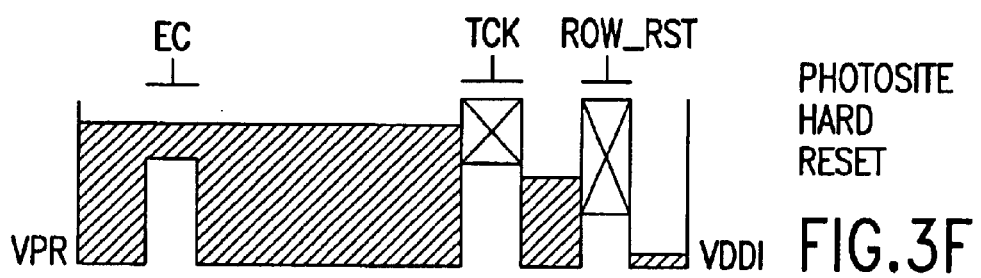
Figure 3G:
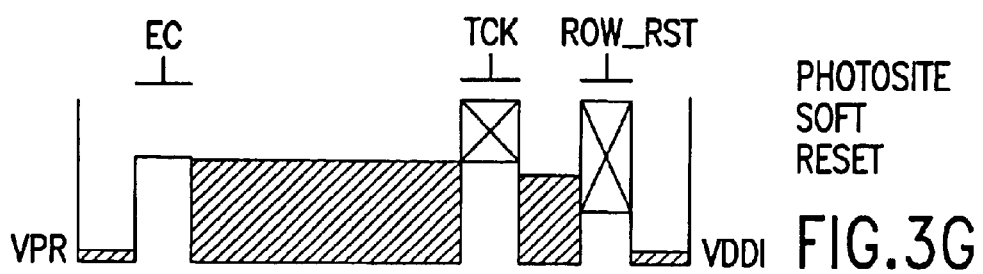
Figure 3H:
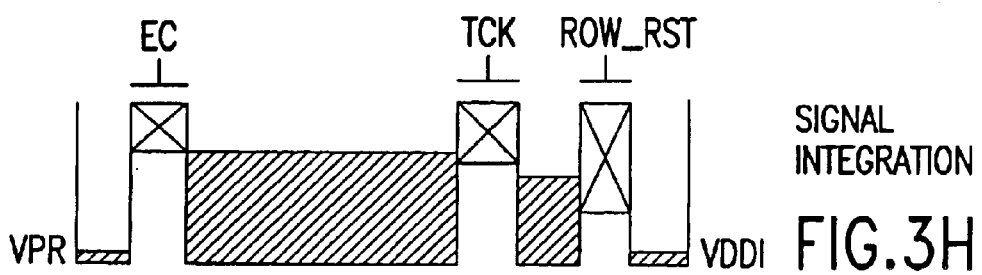
Figure 4A:
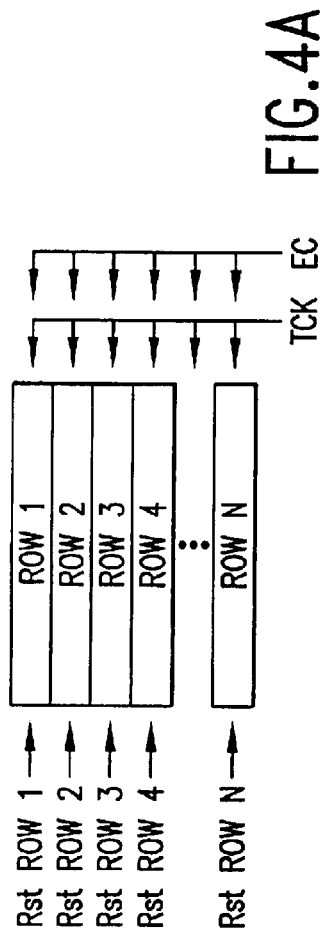
FIGS. 4A and 4B are timing diagrams showing the timing sequence for an array of N rows configured with a 5T pixel of the present invention.
Figure 4B:
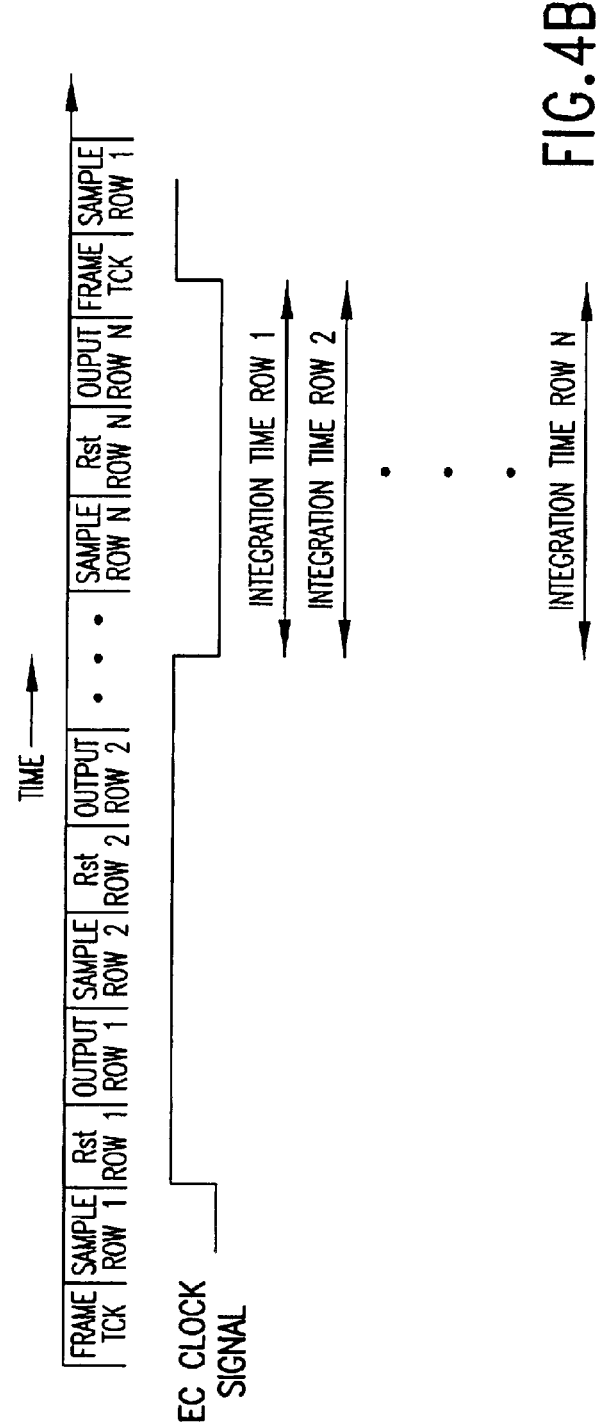

The solution offered in the present invention is to perform a "hard" reset immediately followed by a "soft" reset as illustrated in FIGS. 3D through 3H. FIG. 3D illustrates the pixel immediately after the signal charge transfer from the photosite to the sense node. In FIG. 3E, the photosite reset begins when voltage EC is clocked high. Note that the high level on voltage EC is just slightly lower than the high level on voltage TCK. In FIG. 3F, preset voltage VPR is clocked low. Electron charge transfers into the photosite until the photosite to be reset has a voltage equal to voltage VPR (i.e., a "hard" reset). In FIG. 3G, voltage VPR is clocked high again, at which point, excess electron charge is spilled from the photosite into drain VPR ("soft" reset) and drained away. This intentionally sets the photosite level to a level that is proportional to the local value of the threshold voltage. Since spatial variations in the threshold voltage of transistor will be smaller within a single pixel than across the array, the portion of the "soft" preset voltage attributed to the transistor threshold will be substantially removed later during readout by the threshold voltage of transfer gate transistor 16. The duration of the high pulse to the EC clock is to be equal to the duration of the high pulse on the TCK gate after integration to ensure that lag is minimized. This "hard/soft" reset sequence eliminates lag due to the reset operation, and minimizes the variations across the array in the magnitude of the fat zero signal (i.e. reduces FPN). In FIG. 3H, photocharge integration is resumed. Without this approach, the user either sees large FPN (i.e. hard reset only) or sees large image lag (i.e. soft reset only). Note that the sense node can be "hard" reset independently of what type of reset operation is used for the photosite.

The most flexible arrangement to achieve this process is illustrate in FIG. 1. However some biases may be ganged together (e.g., voltage VOD and/or voltage VPR may be tied to voltage VDD). A hard reset can be ensured by setting the drain voltage VOD to be lower than the high level of the channel voltage beneath reset gate transistor 20.

Figure 7E:
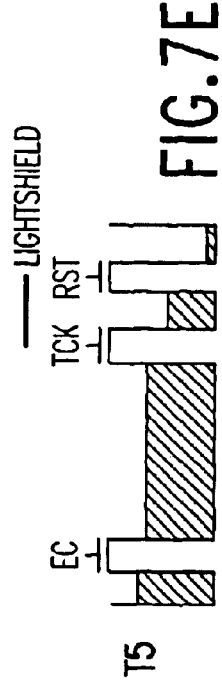
FIGS. 7A through 7H are potential diagrams of the sense node reset timing and its place in the pixel sensing cycle.
Figure 7F:
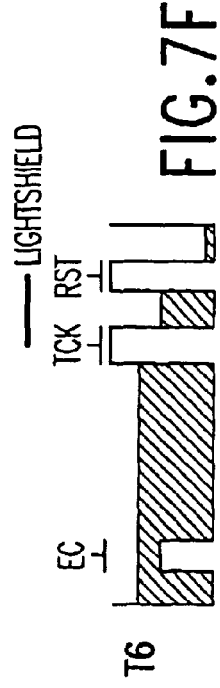
Figure 7G:
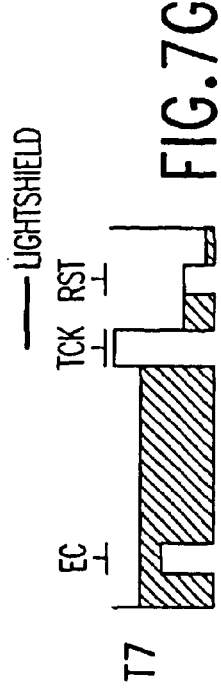
Figure 7H:
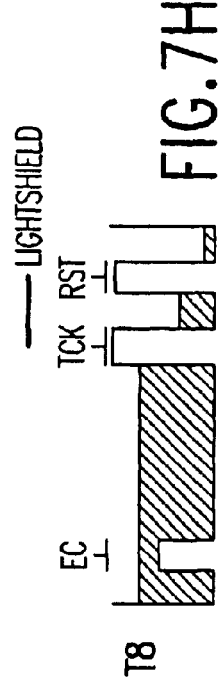
Figure 7A:
Figure 7B:
Figure 7C:
Figure 7D:

In FIG. 7A, at time T1, voltage EC is at its high level while voltage VPR is low so that the photosite is filled with charge. In FIG. 7B, at time T2, voltage EC returns low to isolate the charge in the photosite from drain VPR. In FIG. 7C, at time T3, charge accumulates in the isolated photosite during the integration period. In FIG. 7D, at time T4, voltage TCK becomes high to cause accumulated photocharge to transfer to the sense node from the photosite. In FIG. 7E, at time T5, voltage TCK becomes low and the sense node becomes isolated from the photosite. In FIG. 7F, at time T6, the readout cycle (which is non-destructive) begins. In FIG. 7G, at time T7 after the readout cycle ends (at least ends for the particular pixel), the sense node (junction 18) is reset to output drain voltage VOD by pulsing voltage RST to a high voltage to turn on reset transistor 20. In FIG. 7H, at time T8, voltage RST returns to a low voltage to again isolate the sense node from output drain voltage VOD. During the end of the cycle (T6, T7 and T8) and in the beginning of the cycle (T1) voltage EC is maintained at a high level and preset voltage VPR is maintained at a low level so that the photosite is "hard" reset to a level of preset voltage VPR at its low level.

Persons skilled in the art will appreciate in light of these teachings that the 5T pixel could be implemented with a photodetector constituted by either a pinned photodiode or a surface gated diode so that the photosite could be fully depleted upon charge transfer from the photosite to the sense node and the exposure control transistor drain. The photodetector could be implemented with an N well implanted region (as in a buried channel configuration) or an n+ implanted region (as in a surface channel configuration). This would eliminated all issues associated with fat zeros, image lag, and most importantly would remove all sensitivity to pixel to pixel variations in the threshold voltage beneath the transfer gate transistor gate electrodes that show up as fixed pattern noise.

Persons skilled in the art will appreciate in light of these teachings that plural pixels as described above are incorporated into a sensor that includes control circuitry to control the pixel operations. Persons skilled in the art in light of these teaching will appreciate that the construction of control circuitry sufficient to generate the clock signals and control voltages at the above described voltage levels and with the above described timing to affect the operation of the sensor can be made or adapted from known control circuits.

The above described novel pixel is suitable for non-rolling shutter and non-rolling shutter with antiblooming and exposure control applications. It is suitable for low lag and low fat zero FPN applications independent of non-rolling shutter operation. It is suitable for use in any area device for high speed motion capture.

Having described preferred embodiments of a novel five transistor CMOS pixel (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims:

What is claimed is:

1. A method of sensing radiation in a pixel, the method comprising steps of:

applying a transfer clock signal to a gate electrode of a transfer gate transistor;

applying a pixel reset clock signal to a gate electrode of the pixel reset transistor;

applying a pixel reset voltage to a drain of the pixel reset transistor;

switching the transfer clock signal to a low state;

switching the pixel reset clock signal to a high state;

switching the pixel reset voltage to a low state;

switching the pixel reset voltage to a high state; and switching the pixel reset clock signal to a low state at a beginning of an integration cycle.

2. The method of claim 1, further comprising a step of switching the transfer clock signal to a high state at an end of the integration cycle to transfer integrated signal charge from the well of the photodetector to a storage node.

3. The method of claim 2, wherein:

the step of switching the pixel reset voltage to a low state includes transferring signal charge into a well of the photodetector; and the step of switching the pixel reset voltage to a high state includes transferring some of the signal charge out of the well of the photodetector until the voltage in the well of the photodetector equals the voltage of the pixel reset clock signal in the high state adjusted for a transistor threshold.

4. A method of using a five transistor pixel comprising steps of:

transferring a prior charge from a photodetector to a storage node at a beginning of a first readout interval;

reading out the prior charge from the storage node during the first readout interval; and integrating a first charge on the photodetector during an integration fraction of the first readout interval, the integration fraction being less than a whole of the first readout interval.

5. The method of claim 4, further comprising a step of spilling and draining away photodetector charge from the photodetector when a voltage corresponding to the photodetector charge exceeds an anti-blooming threshold during the integration fraction of the first readout interval.

6. The method of claim 5, further comprising a step of draining away photodetector charge from the photodetector when a voltage corresponding to the photodetector charge exceeds a preset voltage during an exposure control fraction of the first readout interval.

7. The method of claim 4, further comprising a step of draining away photodetector charge from the photodetector when a voltage corresponding to the photodetector charge exceeds a preset voltage during an exposure control fraction of the first readout interval.

8. A method of using a five transistor pixel comprising steps of:

transferring a prior charge from a photodetector to a storage node at a beginning of a first readout interval;

reading out the prior charge from the storage node during the first readout interval; and spilling and draining away photodetector charge from the photodetector when a voltage corresponding to the photodetector charge exceeds an anti-blooming threshold during an integration fraction of the first readout interval.

9. The method of claim 8, further comprising a step of draining away photodetector charge from the photodetector when a voltage corresponding to the photodetector charge exceeds a preset voltage during an exposure control fraction of the first readout interval.

10. A method of using a five transistor pixel comprising steps of:

transfer ring a prior charge from a photodetector to a storage node at a beginning of a first readout interval;

reading out the prior charge from the storage node during the first readout interval; and draining away photodetector charge from the photodetector when a voltage corresponding to the photodetector charge exceeds a preset voltage during an exposure control fraction of the first readout interval.

11. A method comprising steps of:

transferring a prior photodetector charge from a photodetector through a transfer gate to a storage node during a time period of a predetermined length;

setting a first photodetector charge on the photodetector based on a first pixel preset voltage in a hard reset process;

draining charge from the photodetector to leave a second photodetector charge on the photodetector based on a second pixel preset voltage in a soft reset process.

12. The method of claim 11, wherein the step of draining transfers charge from the photodetector during another time period of the predetermined length.

13. The method of claim 11, wherein:

the step of transferring includes applying a transfer clock at a predetermined voltage to a gate electrode of the transfer gate during the period of time of the predetermined length;

the step of draining includes transferring charge from the photodetector through an exposure control gate; and the step of draining further includes applying an exposure control clock at the predetermined voltage to a gate electrode of the exposure control gate during another period of time of the predetermined length.

14. The method of claim 13, wherein:

the step of setting includes transferring charge from a drain that is set to the first pixel preset voltage through the exposure control gate to the photodetector; and the step of draining further includes transferring charge from the photodetector through the exposure control gate to the drain while the drain is set to the second pixel preset voltage.

15. The method of claim 11, wherein:

the step of setting follows the step of transferring; and the step of draining follows the step of setting.

16. The method of claim 11, wherein the step of setting includes transferring charge from a drain that is set to the first pixel preset voltage through an exposure control gate to the photodetector.

17. The method of claim 16, wherein the step of draining includes transferring charge from the photodetector through the exposure control gate to the drain while the drain is set to the second pixel preset voltage.

18. The method of claim 17, wherein the second pixel preset voltage is more positive than the first pixel preset voltage.

* * * * *